United States Patent
Andreoli-Fang

(10) Patent No.: US 11,889,592 B2
(45) Date of Patent: *Jan. 30, 2024

(54) SYSTEM AND METHOD FOR PIPELINING LTE SIGNALING

(71) Applicant: CABLE TELEVISION LABORATORIES, INC., Louisville, CO (US)

(72) Inventor: Jennifer Andreoli-Fang, Boulder, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 195 days.

This patent is subject to a terminal disclaimer.

(21) Appl. No.: 16/895,087

(22) Filed: Jun. 8, 2020

(65) Prior Publication Data

US 2020/0305233 A1 Sep. 24, 2020

Related U.S. Application Data

(63) Continuation of application No. 15/918,864, filed on Mar. 12, 2018, now Pat. No. 10,681,775.

(Continued)

(51) Int. Cl.
*H04W 88/10* (2009.01)
*H04W 28/02* (2009.01)
(Continued)

(52) U.S. Cl.
CPC ......... *H04W 88/10* (2013.01); *H04L 41/0826* (2013.01); *H04L 65/65* (2022.05);
(Continued)

(58) Field of Classification Search
CPC ........... H04W 84/045; H04W 72/1252; H04W 28/0278; H04W 92/02; H04W 72/14;
(Continued)

(56) References Cited

U.S. PATENT DOCUMENTS

| | | | |
|---|---|---|---|
| 7,392,279 B1* | 6/2008 | Chandran | H04L 47/568 709/200 |
| 9,326,218 B2* | 4/2016 | Gunnarsson | H04W 92/20 |

(Continued)

*Primary Examiner* — Yee F Lam
(74) *Attorney, Agent, or Firm* — Elevated IP, LLC

(57) ABSTRACT

A system and method for reducing latency in a wireless-to-wired backhaul environment, such as a LTE-Backhaul environment. In the LTE-Backhaul embodiment, the system and method rely on a modification to the eNodeB (eNB). This modification causes the eNB to generate a bandwidth report (BWR) upon receipt of a buffer status report (BSR) associated with an RRC encapsulated NSA signaling. The BWR provides a notification to the backhaul system that SCTP signaling, which is associated with the RRC encapsulated NSA signaling, is forthcoming. In addition, the present system and method provides for a periodic transmission of a grant (e.g., a MAP in a DOCSIS embodiment) in the backhaul portion. The backhaul grant provides for the modem to immediately forward the BWR to the modem termination system (MTS) upon receipt of the BWR such that the MTS may prepare a grant for the forth coming SCTP signaling.

9 Claims, 5 Drawing Sheets

Related U.S. Application Data

(60) Provisional application No. 62/469,905, filed on Mar. 10, 2017.

(51) Int. Cl.
  *H04W 76/12* (2018.01)
  *H04W 88/08* (2009.01)
  *H04L 41/0826* (2022.01)
  *H04L 65/65* (2022.01)

(52) U.S. Cl.
  CPC ........ *H04W 28/0278* (2013.01); *H04W 76/12* (2018.02); *H04W 88/085* (2013.01)

(58) Field of Classification Search
  CPC ......... H04W 28/0268; H04W 28/0289; H04W 28/24; H04L 12/4625; H04L 12/2801
  See application file for complete search history.

(56) References Cited

U.S. PATENT DOCUMENTS

| | | | |
|---|---|---|---|
| 2003/0103527 A1* | 6/2003 | Beser | H04L 47/70 370/468 |
| 2009/0109933 A1* | 4/2009 | Murasawa | H04L 63/029 370/335 |
| 2013/0010686 A1 | 1/2013 | Shatzkamer et al. | |
| 2013/0315134 A1 | 11/2013 | Halfmann et al. | |
| 2014/0092866 A1 | 4/2014 | Teyeb et al. | |
| 2014/0321282 A1 | 10/2014 | Pragada et al. | |
| 2015/0043492 A1 | 2/2015 | Baek et al. | |
| 2015/0124630 A1 | 5/2015 | Ozer et al. | |
| 2015/0230267 A1* | 8/2015 | Lee | H04W 72/0413 370/336 |
| 2016/0157124 A1* | 6/2016 | Wilkinson | H04W 16/18 370/254 |
| 2017/0026405 A1 | 1/2017 | Vengalil et al. | |
| 2017/0230891 A1 | 8/2017 | Fang | |
| 2017/0238342 A1* | 8/2017 | Yang | H04W 16/14 370/329 |
| 2017/0265216 A1* | 9/2017 | Andreoli-Fang | H04W 84/045 |
| 2018/0270103 A1* | 9/2018 | Chapman | H04L 41/06 |
| 2019/0021126 A1* | 1/2019 | Chun | H04W 76/22 |
| 2019/0045534 A1* | 2/2019 | Zaks | H04W 72/14 |
| 2019/0058508 A1* | 2/2019 | Yiu | H04B 7/088 |
| 2019/0059031 A1 | 2/2019 | Hahn et al. | |
| 2019/0215214 A1 | 7/2019 | Kim et al. | |
| 2019/0274064 A1* | 9/2019 | Chapman | H04W 72/1252 |
| 2021/0076368 A1* | 3/2021 | Malkamaki | H04B 7/2606 |

* cited by examiner

SYSTEM AND METHOD FOR PIPELINING LTE SIGNALING

RELATED APPLICATIONS

This application is a continuation of U.S. application Ser. No. 15/918,864, filed Mar. 12, 2018, which application claims priority to U.S. Provisional Application Ser. No. 62/469,905 (hereinafter "905 provisional"), filed 10 Mar. 2017. Both applications are incorporated herein by reference in their entirety.

THE NAMES OF THE PARTIES TO A JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are CABLE TELEVISION LABORATORIES, INC. and CISCO SYSTEMS, INC.

TECHNICAL FIELD

This disclosure relates in general to the field of communications and, more particularly, to techniques for integration of wireless access and wireline networks.

BACKGROUND

Today's communication systems may include separate wireless and wireline portions, each of which may be owned and controlled by different operators. Even though some cable operators, also known as Multiple System Operators ("MSOs") use Data Over Cable Service Interface Specification ("DOCSIS") networks for backhauling Internet traffic, separate networks, such as mobile core, DOCSIS, and radio, have limited to no visibility into parts of the other network types. Typically, each network type, such as DOCSIS and LTE, have separate traffic scheduling algorithms. As a result, currently when these types of networks are combined, the resulting architecture may be inefficient and may result in longer latency.

SUMMARY OF THE INVENTION

In an embodiment, the present pipelining system and method utilized in a wireless-wired backhaul environment is formed at least partially within and utilized by the backhaul system, which includes a modem and a Modem Termination System (MTS) in communication with a wireless system, which includes a remote radio head and a wireless core. The wireless system herein is discussed as, but not limited to, an LTE wireless system. In these non-limiting embodiments, the remote radio head is represented and discussed as an eNodeB and the wireless core is represented and discussed as an Mobility Management Entity (MME). The wired backhaul system is sometimes discussed herein as a DOCSIS backhaul system, although it will be understood that this is a non-limiting example and merely to ease understanding. It will be understood by the skilled artisan that a backhaul system may be any backhaul system and does not even need to be a wired backhaul system. Furthermore, it will be understood that the MTS may be any one of a CMTS, an ONT, an OLT, a Network Termination Unit, a Satellite Termination Unit, and other termination systems, collectively herein called a "Modem Termination System" or "MTS." The MTS in the present embodiment includes a modem termination system (MTS) device in a backhaul system for backhauling a Stream Control Transmission Protocol (SCTP) initialization message to a MME and/or a centralized Small Cell (cSC). To expedite the backhaul process, the MTS periodically provides unsolicited grants/MAPs to a modem communicatively coupled with the MTS in the backhaul system. The remote radio head (e.g., an eNodeB) also provides a bandwidth report (BWR) to notify the backhaul system that a SCTP initialization message/NAS signaling is forthcoming. The backhaul system advantageously employs the unsolicited grant and BWR with notification to expedite or pipeline the SCTP initialization message/NAS signaling. That is, the at least one unsolicited backhaul grant (e.g., an unsolicited MAP in a DOCSIS embodiment) is put into place within the backhaul system for the purpose of preparing the backhaul communication system to immediately forward the BWR with notification, which acts as a SCTP initialization/NAS notification sent from the eNodeB to the backhaul system.

Other embodiments contemplated utilize an optical network. An optical network may be formed with, by way of example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of x-hauling traffic, examples include without limitation satellite operator's communication systems, Wi-Fi networks, optical networks, DOCSIS networks, MIMO communication systems, microwave communication systems, short and long haul coherent optical systems, etc. X-hauling is defined here as any one of or a combination of front-hauling, backhauling, and mid-hauling. To simplify description, a termination unit such as a CMTS, an ONT, an OLT, a Network Termination Unit, a Satellite Termination Unit, and other termination systems are collectively called a Modem Termination System or MTS. To simplify description a modem unit such as a satellite modem, a modem, an Optical Network Unit (ONU), a DSL unit, etc. is called a "modem." Further, to simplify description a protocol such as DOCSIS, EPON, RFOG, GPON, Satellite Internet Protocol, is called a "protocol."

BRIEF DESCRIPTION OF THE INVENTION

DETAILED DESCRIPTION OF THE FIGURES

The present system and method pipelines or otherwise expedites wireless signaling, such as LTE signaling in one embodiment, via a backhaul network. The present disclosure utilizes a DOCSIS type backhaul network in the bulk of its explanations, embodiments, and examples. This is merely to ease understanding and is not meant to be limiting in any way. The present system and method may be incorporated or implemented in any network capable of backhauling this type of wireless data. For example, other possible backhaul networks would be apparent to the skilled artisan.

Furthermore, the present system and method are discussed as they relate to LTE signaling, but it will be understood by the skilled artisan that other types of wireless data and signaling may be backhauled. For example, other types of data and signaling that may be backhauled include, but are not limited to, 2G, 3G, 4G, 5G, IEEE 802 standards such as but not limited to Wi-Fi, Wi-Fi SON, WiMax, etc., and other wireless protocols known to the skilled artisan. It is also contemplated that the present system and method may be advantageously utilized to backhaul wired data.

Figure 1:
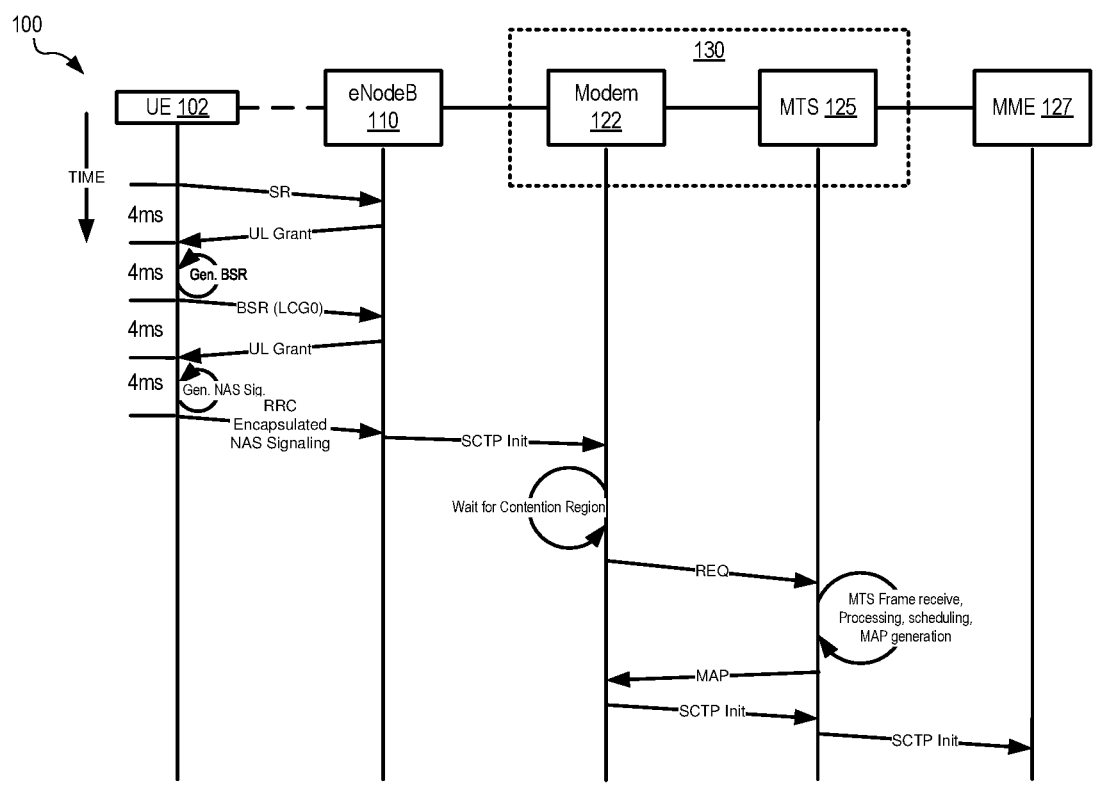
FIG. 1 shows one simplified block diagram and timing diagram for a prior art Remote Radio Head-BackHaul (RRH-BH) communication system in a wireless-wired Backhaul environment, in an embodiment.

FIG. 1 shows one prior art simplified block diagram and timing diagram for a RRH-BH communication system 100 shown as an LTE-Backhaul system, in one non-limiting embodiment. System 100 employs an eNodeB 110 (also called herein an eNB) located between and in wireless communication with a User Equipment (UE) 102 and wired communication with a modem 122. Modem 122 is also in wired communication with a modem termination unit (MTS) 125. MTS 125 is in communication with an Mobility Management Entity (MME) 127. A backhaul system 130 is shown here to include modem 122 and MTS 125.

LTE signaling messages are sent on the air interface with a Signaling Radio Bearer (SRB). An SRB is a radio bearer that carries DCCH signalling data. An SRB is used during connection establishment to establish the Radio Access Bearers (RABs) and then also to deliver signalling while on the connection, for example, to perform a handover, reconfiguration, or release.

In the embodiment shown in FIG. 1 signaling includes Radio Resource Control (RRC) messages between the UE and the eNB sent on wireless link therebetween. In one example, messages are sent by Signalling radio bearer 0 (SRB0) on Common Control Channel (CCCH) or Signalling radio bearers 1 (SRB1) on Dedicated Control Channel (DCCH).

In addition, NAS messages are sent between the UE and the MME, encapsulated in an RRC which is transmitted from the UE to the MME via the backhaul system, described further below. NAS messages may be sent on SRB2 on DCCH.

For NAS messages sent from the UE to the MME, at UE startup the eNB maps Logical Channel 2 (LC2)/SRB2 to a Logical Channel Group (LCG). When the UE becomes operational after start-up, the eNB provides a grant to the UE for SRB2 in a subframe. After eNB receives the NAS message it establishes an SCTP stream with the MME. eNB then sends the NAS message to the MME via the backhaul system. The following is one simplified version of the above described serial process as known in the prior art.

UE 102 transmits a Status Report (SR) data to eNodeB 110. Upon receipt of the SR eNodeB 110 generates an Uplink (UL) grant and transmits it back to UE 102. As shown, the transmission of the SR and receipt of the of the UL grant occurs within the standard 4 ms window. UE 102 processes the UL grant and generates a Logical Channel Group 0 (LCG0) Buffer Status Report (BSR) (called herein after BSR (LCG0)) within the next 4 ms time segment. UE 102 then transmits the BSR (LCG0) to eNodeB 110. Upon receipt of the BSR (LCG0) eNodeB 110 generates a second UL grant, which is sent back to UE 102, again a process taking place in the standard 4 ms window. Upon receipt of the second UL grant at UE 102 an RRC encapsulated NAS signaling is generated and prepared for transmission, again, taking place within the standard 4 ms window.

The RRC encapsulated NAS signaling/message(s) is then transmitted from UE 102 to eNodeB 110. Upon receipt of the RRC encapsulated NAS signaling, eNodeB 110 prepares and transmits a Stream Control Transmission Protocol (SCTP) initialization to MME 127 via backhaul system 130. Upon receipt of the SCTP initialization message modem 122 waits for a contention region. In a non-limiting DOCSIS embodiment described here, the total time scheduled in a single bandwidth allocation map (MAP) message is referred to as the MAP length and the time interval assigned to the contention channel is called the contention region, whereas the remaining part of the MAP length is termed the reservation region. Waiting for the contention region may take as little as 2 ms but will depend on traffic and vender implementation. Modem 122 then sends a request for resources (REQ) to MTS 125. MTS 125 processes the received REQ and schedules and generates a MAP for modem 122 to transmit the SCTP initialization. MTS 125 transmits the MAP back to modem 122 which, upon receipt, transmits the SCTP initialization at the MTS determined time slot. Upon receipt of the SCTP initialization from modem 122, MTS 125 forwards the SCTP initialization to MME 127, finalizing the process described in FIG. 1.

Figure 2A:
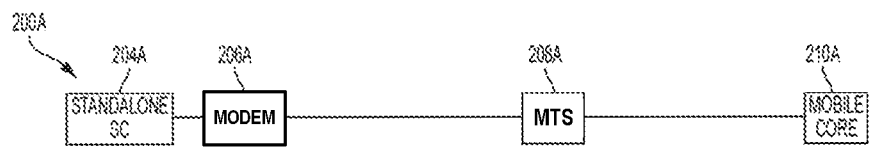
FIGS. 2A-2C are simplified block diagrams illustrating various arrangements of RRH-BHs, shown as Small Cell-BackHaul ("SC-BH") systems, which include a standalone small cell (SC) for connecting user equipment ("UE") to a mobile core in accordance with embodiments described herein.

FIG. 2A illustrates a simplified block diagram of one embodiment of a small cell-backhaul (SC-BH) system communications environment 200A in which a communication network, such as but not limited to a DOCSIS network, is used to provide a backhaul for small cell data, such as but not limited to an LTE eNB, 4G, 5G, WiMAX, Wi-Fi, etc. data. The communication environment 200A supports connection of at least one UE (not shown, but similar to that shown in communication system 100), via a radio frequency ("RF") interface to a standalone small cell (SC) 204A. Small cells are available for a wide range of air interfaces including GSM, CDMA2000, TD-SCDMA, W-CDMA, LTE and WiMAX. In 3GPP terminology, a Home Node B (HNB) is a 3G femtocell. A Home eNodeB (HeNB) is an LTE femtocell. Wi-Fi is a small cell but does not operate in licensed spectrum. As used herein, UE can be associated with clients, customers, or end users wishing to initiate a communication in a communication system via some network. The term "user equipment" is inclusive of devices used to initiate a communication, such as a computer, a personal digital assistant (PDA), a laptop or electronic notebook, a cellular telephone, a smartphone, an IP phone, or any other device, component, element, or object capable of initiating voice, audio, video, media, or data exchanges within a communication system. UE may also be inclusive of a suitable interface to the human user, such as a microphone, a display, or a keyboard or other terminal equipment. UE may also be any device that seeks to initiate a communication on behalf of another entity or element, such as a program, a database, or any other component, device, element, or object capable of initiating an exchange within a communication system. The detail and best practice associated with the deployment of small cells varies according to use case and radio technology employed. Data, as used herein in this document, refers to any type of numeric, voice, video, media, or script data, or any type of source or object code, or any other suitable information in any appropriate format that may be communicated from one point to another. On power up, UE can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

Referring again to FIG. 2A, the SC 204A is connected to a modem 206A. The modem 206A may be connected to one or multiple SC 204A. The modem 206A is connected to a modem termination system ("MTS") 208A via a communication link, such as but not limited to a hybrid fiber coax ("HFC"), for example. In the embodiment illustrated in FIG. 2A, the MTS 208A is implemented as an integrated MTS ("I-MTS"). The MTS 208A connects SC 204A/modem 206A to a wireless core, which in the illustrated embodiment comprises a mobile core 210A. It will be recognized that a wireless core may also comprise a Wi-Fi core, LTE packet core, a 5G core, WiMAX core or any other wireless network core. It will be understood that modem 206A may be collocated with SC 204A or may be located separate and independent from SC 204A. Additionally, a collocated combination of SC 204A/modem 206A may be referred to herein as a SC-BH network element.

Figure 2B:
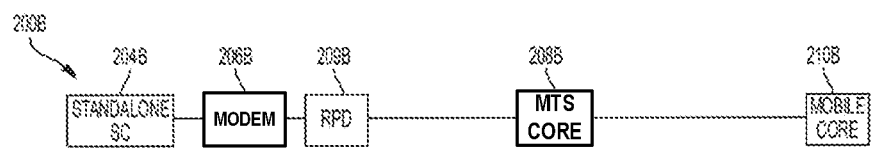

FIG. 2B illustrates a simplified block diagram of another embodiment of a SC-BH system communications environment 200B in which a communication network, such as but not limited to a DOCSIS network, is used to provide a backhaul for SC 204B, an example of which is an LTE eNB. Similar to the communications environment 200A, the communications environment 200B supports connection of at least one UE via an RF interface to a standalone SC 204B. One or multiple SC 204B may be connected to a modem 206B. In the embodiment shown in FIG. 2B, MTS functionality is split between a MTS core 208B and a Remote PHY Device (RPD) 209B. The RPD 209B/MTS core 208B connects the SC 204B and modem 206B to a mobile core 210B, which may be implemented as an LTE packet core. It will be understood that modem 206B may be collocated with SC 204B or may be located separate and independent from the SC. Additionally, a collocated combination of the SC 204B/modem 206B may be referred to herein as a SC-BH network element.

Figure 2C:
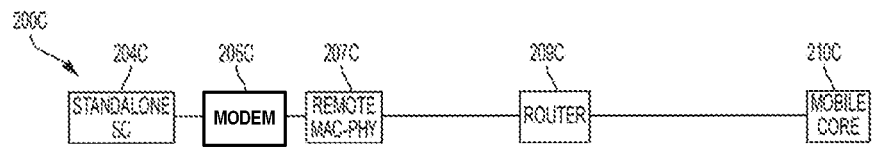

FIG. 2C illustrates a simplified block diagram of yet another embodiment of a SC-BH system communications environment 200C in which a communication network, such as but not limited to a DOCSIS network, is used to provide a backhaul for an LTE eNB. Similar to the communications environment 200A, the communications environment 200C supports connection of at least one UE via an RF interface to a standalone SC 204C. One or multiple SC 204C is connected to a modem 206C. In the embodiment shown in FIG. 2C, MTS functionality is split between a remote MAC/PHY 207C and a router 209C. The remote MAC/PHY 207C/router 209C connects the SC 204C/modem 206C to a mobile core 210C, which may be implemented as an LTE packet core. It will be understood that modem 206C may be collocated with SC 204C or may be located separate and independent from the SC. Additionally, a collocated combination of the SC 204C/modem 206C may be referred to herein as a SC-BH network element.

Figure 2D:
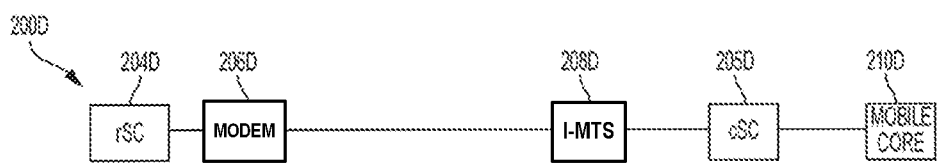
FIGS. 2D-2F are simplified block diagrams illustrating various arrangements of RRH-BHs, shown as rSC-BH systems including a split small cell for connecting UE to a mobile core communicatively coupled with a centralized small cell in accordance with embodiments described herein.

FIG. 2D illustrates a simplified block diagram of one embodiment of a SC-BH system communications environment 200D in which a communication network, such as but not limited to a DOCSIS network, is used to provide a backhaul for an LTE eNB. The communications environment 200D supports connection of at least one UE via an RF interface to a remote Small Cell (rSC) 204D portion of a split small cell, which also includes a centralized Small Cell (cSC) portion 205D. One or more rSC 204D is connected to a modem 206D (also sometimes called just "modem" herein). The modem 206D is connected to a modem termination system ("MTS") 208D via hybrid fiber coax ("HFC"), for example. In the embodiment illustrated in FIG. 2D, the MTS 208D is implemented as an I-MTS. The MTS 208D/cSC 205D connects the rSC 204D/modem 206D to a mobile core 210D, which may be implemented as an LTE packet core. It will be understood that modem 206D may be collocated with rSC 204D or may be located separate and independent from the rSC. Additionally, a collocated combination of the rSC 204D/modem 206D may be referred to herein as a SC-BH network element. In certain embodiments, I-MTS, cSC, and/or mobile core may also be collocated.

Figure 2E:
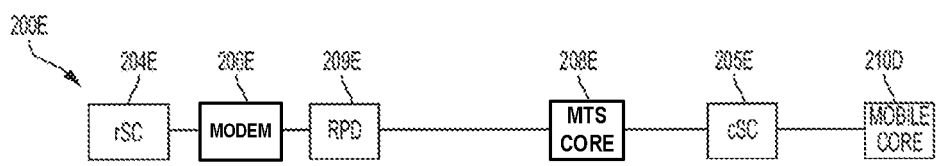

FIG. 2E illustrates a simplified block diagram of another embodiment of a SC-BH system communications environment 200E in which a communication network, such as but not limited to a DOCSIS network, is used to provide a backhaul for an LTE eNB. Similar to the communications environment 200A, the communications environment 200E supports connection of at least one UE via an RF interface to an rSC 204E portion of a split SC, which also includes a cSC portion 205E. One or more rSC 204E is connected to a modem 206E. In the embodiment shown in FIG. 2E, MTS functionality is split between a MTS core 208E and an RPD 209E. The RPD 209E/MTS core 208E/cSC 205E connects the rSC 204E/modem 206E to a mobile core 210E, which may be implemented as an LTE packet core. It will be understood that modem 206E may be collocated with rSC 204E or may be disposed in a location separate and independent from the rSC. Additionally, a collocated combination of the rSC 204E/modem 206E may be referred to herein as a SC-BH network element.

Figure 2F:
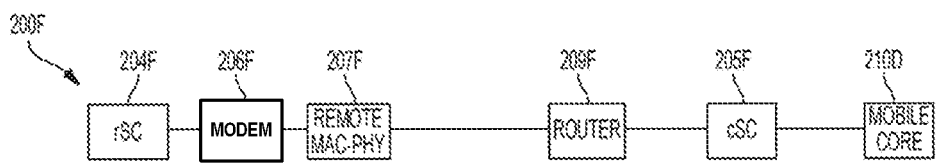

FIG. 2F illustrates a simplified block diagram of yet another embodiment of a SC-BH system communications environment 200F in which a communication network, such as but not limited to a DOCSIS network, is used to provide a backhaul for an LTE eNB. Similar to the communications environment 200A, the communications environment 200F supports connection of at least one UE via an RF interface to an rSC 204F portion of a split SC, which also includes a cSC portion 205F. One or more rSC 204F is connected to a modem 206F. In the embodiment shown in FIG. 2F, MTS functionality is split between a remote MAC/PHY 207F and a router 209F. The remote MAC/PHY 207F/router 209F/cSC 205F connects the rSC 204F/modem 206C to a mobile core 210F, which may be implemented as an LTE packet core. It will be understood that modem 206F may be collocated with rSC 204F or may be disposed in a location separate and independent from the rSC. Additionally, a collocated combination of the rSC 204F/modem 206F may be referred to herein as a SC-BH network element.

It will be noted that FIGS. 2A-2C illustrate embodiments comprising a standalone SC, while FIGS. 2D-2F illustrate embodiments comprising a split SC. It will be recognized that techniques described herein are equally applicable to any of the embodiments shown in FIGS. 2A-2F. It will be further recognized that the embodiments illustrated in FIGS. 2A-2F are provided for purposes of example only and are not meant to be an exhaustive list of embodiments in which the techniques described herein may be advantageously implemented. Moreover, although not illustrated in FIGS. 2A-2F, a network interface device ("NID") may optionally be provided between the SC/rSC and modem.

Figure 3:
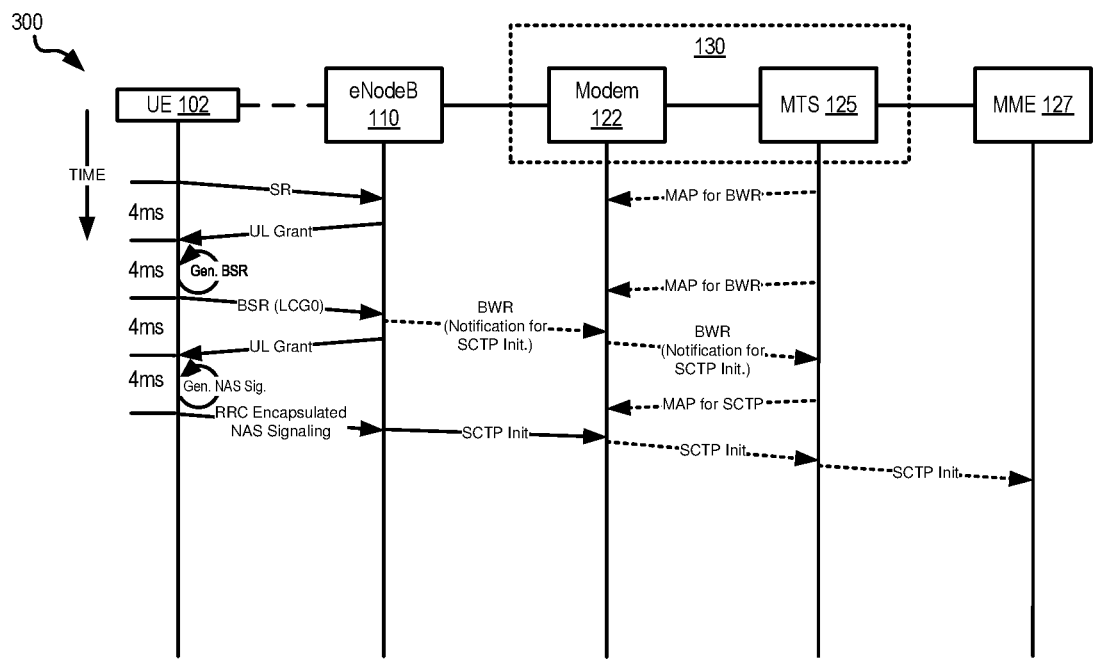
FIG. 3 shows one exemplary simplified block diagram and timing diagram for a RRH-BH communication system configured for Pipelining Non-Access Stratum (NAS) messages, in an embodiment.

FIG. 3 shows one exemplary system and timing diagram 300 for backhauling wireless signaling, LTE signaling in the present embodiment, in an expedited or pipelined manner.

System and timing diagram 300 contains the same components and connections as that shown environment 100, namely a UE 102, a remote radio head or eNodeB 110, an MTS 125, and an MME 127. To highlight the differences between system and timing diagram 300 of FIG. 3 and environment 100 of FIG. 1, new processes and timing flows are shown in dashed lines. As can be seen a significant latency reduction is achieved over the prior art process discussed in FIG. 1.

UE 102 sends a Status Report (SR) to eNodeB (eNB) 110. eNB 110 processes the SR and provides a first UL grant back to UE 102 in a subframe. UE 102 then generates the Logical Channel Group 0 (LCG0) Buffer Status Report (hereinafter BSR (LCG0)) associated with the previously transmitted SR. Note, the same process may be applied to a different Logical Channel Group, such as LCG1 to generate a BSR (LCG1). The generated BSR (LCG0) is sent back to eNB 110. eNB 110 then generates a second UL grant for UE 102 to send its RRC encapsulated NAS signaling data. Since eNodeB 110 has data which identifies which logical channel group it is providing this grant for, eNodeB 110 also knows when to expect the associated NAS message. Thus, when eNodeB 110 generates and sends a second UL grant back for the NAS message to UE 102 it also sends a BWR containing a notification for SCTP initialization to the backhaul system, which enables MTS 125 to generate a pre-grant for the transfer of the SCTP initialization message to MME 127. This allows the SCTP stream to be established earlier than has been done in the prior art, discussed in FIG. 1, above.

After eNodeB 110 receives the RRC encapsulated NAS message from UE 102, eNodeB 110 sends a SCTP initialization message to modem 122. Since SCTP initialization message uses MME 127's IP destination, the SCTP initialization message can be classified by modem 122 to use the pre-granted MAP for SCTP initialization sent from MTS 125. One nonlimiting system and process is described in more detail, below.

UE 102 sends a Status Report (SR) to eNodeB (eNB) 110. eNB 110 processes the SR and provides a first UL grant back to UE 102 in a subframe. UE 102 then generates a BSR (LCG0) associated with the previously transmitted SR. Prior to and during the transmission of the SR, UL grant, and the BSR (LCG0) between UE 102 and eNB 110 the MTS 125 periodically generates and transmits a grant (called a MAP in a DOCSIS environment) in preparation for the arrival of a bandwidth report (BWR) at modem 122. Upon the arrival of BSR (LCG0) at eNB 110 the eNodeB generates a BWR and sends it to modem 122. This BWR represents a notification for SCTP initialization. As the MAP for BWR has been pre-sent by MTS 125 to modem 122 in anticipation of the arrival of the BWR notification for SCTP initialization, the BWR is transmitted from modem 122 to MTS 125 without any additional communication required or undue delay.

Upon receipt of the BWR at MTS 125, MTS 125 prepares a MAP for the SCTP initialization in anticipation of its arrival at modem 122. At the same time the receipt of the BWR and the preparation of the MAP occurs at MTS 125 the eNB 110 prepares and transmits an UL grant to UE 102. In response UE 102 prepares and transmits the RRC encapsulated NAS signaling/message back to eNodeB 110. Upon receipt of the RRC encapsulated NAS signaling the eNodeB 110 prepares and transmits the SCTP initialization to modem 122, where the previously discussed MAP for SCTP awaits it for immediate transmission to MTS 125 which then forwards it to MME 127. MME 127 then prepares and sets up a SCTP stream for the transmission of the NAS message held at eNodeB 110 (the process not shown as it is known in the art).

By configuring eNodeB 110 to generate and transmit a BWR (notification for SCTP initialization) to the backhaul system and configuring MTS 125 to periodically generate and transmit a MAP for the BWR such that modem 122 can then immediately forward the BWR to MTS 125 for preparation of the MAP for SCTP, a significant latency reduction is realized.

Figure 4:
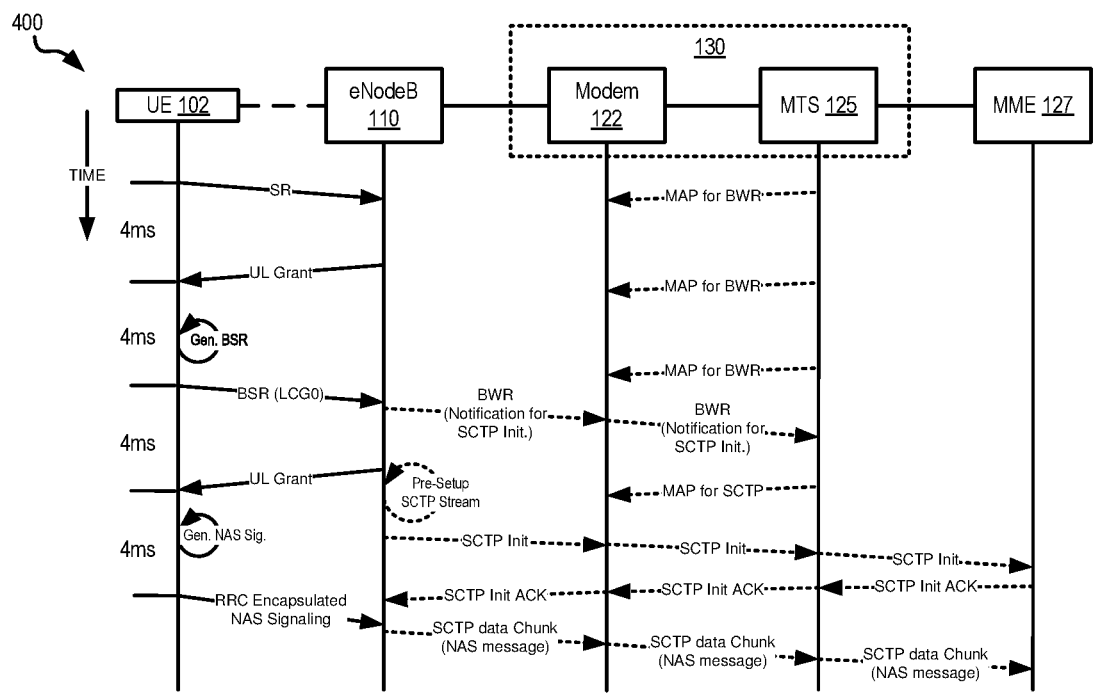
FIG. 4 shows one exemplary simplified block diagram and timing diagram for a RRH-BH communication system configured for Enhanced Pipelining Non-Access Stratum (NAS) messages, in an embodiment.

FIG. 4 shows one exemplary simplified block diagram and timing diagram for a RRH-BH communication system configured for Enhanced Pipelining Non-Access Stratum (NAS) messages, in an embodiment.

UE 102 sends a Status Report (SR) to eNodeB (eNB) 110. eNB 110 processes the SR and provides a first UL grant back to UE 102 in a subframe. UE 102 then generates a BSR (LCG0) associated with the previously transmitted SR and received grant. Prior to and during the transmission of the SR, UL grant, and the BSR (LCG0) between UE 102 and eNB 110 the MTS 125 periodically generates and transmits an unsolicited grant (called a MAP in a DOCSIS environment) in preparation for the arrival of a bandwidth report (BWR) at modem 122. Upon the arrival BSR (LCG0) at eNB 110 the eNodeB generates a BWR and sends it to modem 122. This BWR represents a notification for SCTP initialization. As the MAP for BWR has been pre-sent by MTS 125 to modem 122 in anticipation of the arrival of the BWR notification for SCTP initialization, the BWR is transmitted from modem 122 to MTS 125 without any additional communication required or undue delay.

Upon receipt of the BWR at MTS 125, MTS 125 prepares a MAP for the SCTP initialization in anticipation of its arrival at modem 122. At the same time the receipt of the BWR and the preparation of the MAP occurs at MTS 125 the eNB 110 prepares and transmits an UL grant to UE 102. Before or after eNodeB 110 sends the UL grant to UE 102, eNodeB 110 initializes the process to pre-setup the SCTP stream and sends a pre-generated SCTP initialization to MME 127 via modem 122 and MTS 125. MME 127 then prepares and transmits a SCTP Initialization ACK back to eNodeB 110 via MTS 125 and modem 122. All of this occurs prior to (or at least proximate in time to) the arrival of the RRC encapsulated NAS signaling at eNodeB 110 such that the NAS message is expedited to MME 127.

In response to the UL grant arriving at UE 102, the UE generates the NAS signaling and packages it in an RRC encapsulation. UE 102 then transmits the RRC encapsulated NAS signaling/message back to eNodeB 110. Upon receipt of the RRC encapsulated NAS signaling the eNodeB 110 prepares and transmits the NAS message via the previously set-up SCTP stream to MME 127 via modem 122 and MTS 125.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An x-haul pipelining system, comprising:
a modem termination system (MTS) configured to periodically generate an unsolicited grant for a bandwidth report (BWR) including a Stream Control Transmission Protocol (SCTP) initialization notification, to receive the BWR in accordance with the SCTP initialization notification of the unsolicited grant, and to generate and transmit a grant for an SCTP initialization message upon receipt of the BWR.

2. The x-haul pipelining system of claim 1 further comprising a remote radio head (RRH) in communication with a wireless core and configured to, upon receipt of a buffer status report (BSR) for a logical channel group (LCG), identify the BSR as associated with a Non-Access Stratum (NAS) message requiring a transmission stream and prepare the BWR including the SCTP initialization notification for transmission to the MTS.

3. The x-haul pipelining system of claim 2, wherein the wireless core is communicatively coupled with a centralized small cell (cSC) and the remote radio head is a remote small cell (rSC).

4. The x-haul pipelining system of claim 2, wherein the LCG is one of logical channel group 0 and logical channel group 1.

5. The x-haul pipelining system of claim 4, wherein the RRH identifies the need to generate the BWR including the SCTP initialization notification based at least in part on the LCG information.

6. The x-haul pipelining system of claim 2, wherein the transmission stream is a Stream Control Transmission Protocol (SCTP) stream.

7. The x-haul pipelining system of claim 2, wherein the RRH is further configured to pre-setup the transmission stream after the transmission of the BWR including the SCTP initialization notification.

8. The x-haul pipelining system of claim 7, wherein the RRH is further configured to transmit an initialization message to the wireless core via the x-haul pipelining system and to receive an initialization Acknowledge (ACK) prior to receipt of a Radio Resource Control (RRC) encapsulated NAS message, such that the NAS message is forwarded to the wireless core without undue delay.

9. The x-haul pipelining system of claim 8, wherein the initialization message utilizes the grant for the SCTP initialization message provided by the MTS for entrance of the initialization message to the wireless core.

* * * * *